(12) United States Patent
Hopkins

(10) Patent No.: US 9,572,329 B2
(45) Date of Patent: Feb. 21, 2017

(54) ANTIMICROBIAL CONTAINING FISH HOOK AND METHOD OF USING AND MANUFACTURING SAME

(76) Inventor: Samuel P Hopkins, Freedom, PA (US)

( * ) Notice: Subject to any disclaimer, the term of this patent is extended or adjusted under 35 U.S.C. 154(b) by 1556 days.

(21) Appl. No.: 12/948,898

(22) Filed: Nov. 18, 2010

(65) Prior Publication Data
US 2012/0124886 A1 May 24, 2012

(51) Int. Cl.
*A01K 83/00* (2006.01)

(52) U.S. Cl.
CPC .................................... *A01K 83/00* (2013.01)

(58) Field of Classification Search
CPC ...................................................... A01K 83/00
USPC ......... 43/4–57.3, 4.5, 15, 43.1, 43.16–44.97; 606/222, 223, 76, 330; 604/46, 272, 265
See application file for complete search history.

(56) References Cited

U.S. PATENT DOCUMENTS

| | | | |
|---|---|---|---|
| 1,377,359 A * | 5/1921 | Littlejohn ..................... | 606/223 |
| 2,511,117 A | 6/1950 | Loeb | |
| 2,995,373 A * | 8/1961 | Cox .............................. | 473/581 |
| 3,624,690 A | 11/1971 | Ashley | |
| D242,919 S | 1/1977 | Petersen, Jr. | |
| D244,133 S | 4/1977 | Tart | |
| 4,028,838 A | 6/1977 | Flower | |
| D252,336 S | 7/1979 | Grippi, Jr. | |
| D276,360 S | 11/1984 | Sitton | |
| 4,543,742 A * | 10/1985 | Rand, Jr. ..................... | 43/43.16 |
| 4,570,373 A | 2/1986 | Brief | |
| D283,830 S | 5/1986 | Powell | |
| 4,715,142 A | 12/1987 | Richard | |
| 4,723,372 A | 2/1988 | Moser | |
| 4,858,371 A | 8/1989 | Preiser | |
| 4,922,649 A | 5/1990 | Mitchell | |
| D315,593 S | 3/1991 | Zappe | |
| 4,998,375 A | 3/1991 | Mitchell | |
| 5,024,020 A | 6/1991 | Sitton | |
| 5,339,562 A | 8/1994 | Guerra | |
| D370,048 S | 5/1996 | Smith | |
| 5,589,507 A * | 12/1996 | Hall et al. ..................... | 514/557 |
| 5,762,638 A * | 6/1998 | Shikani et al. ............... | 604/265 |
| D404,795 S | 1/1999 | Nakagawa | |
| 5,875,584 A | 3/1999 | Gowing | |
| 5,875,798 A * | 3/1999 | Petrus ........................... | 132/321 |
| 5,934,006 A * | 8/1999 | Stevenson et al. .......... | 43/42.06 |
| 6,055,763 A | 5/2000 | Trotter | |
| 6,085,456 A | 7/2000 | Battaglia | |
| D440,275 S | 4/2001 | Rosenberg | |
| D467,989 S | 12/2002 | Belland | |
| D469,502 S | 1/2003 | Shelton | |
| 6,723,350 B2 * | 4/2004 | Burrell et al. ................ | 424/618 |

(Continued)

*Primary Examiner* — Danielle Clerkley
(74) *Attorney, Agent, or Firm* — Blynn L. Shideler; Krisanne Shideler; BLK Law Group

(57) ABSTRACT

A fishing hook is plated with, coated with, or contains an antimicrobial substance to treat the impalement wound of a fish caused by the hook. Specifically the hook includes at least one shank; at least one bend that extends from the shank; at least one point defined by a free end of the bend, wherein the fish hook contains a substance whose purpose is to minimize infection and to treat the puncture wound of a fish that is caught. The substance optionally acts to sterilize the hook to reduce the entrance of microbes into the wound when the puncture occurs. The substance may also contain an anti-inflammatory or a pain reliever to reduce the suffering of the fish or of others accidentally injured by the hook.

17 Claims, 1 Drawing Sheet

(56) References Cited

U.S. PATENT DOCUMENTS

| | | | |
|---|---|---|---|
| 6,910,297 B1 | 6/2005 | Sitton | |
| D507,034 S | 7/2005 | Robertson | |
| D522,087 S | 5/2006 | Larsen | |
| 7,159,357 B2 | 1/2007 | Sitton | |
| 7,225,582 B2 | 6/2007 | Shay | |
| D556,292 S | 11/2007 | Shelton | |
| 7,381,751 B2* | 6/2008 | Sarangapani | 514/772.3 |
| 7,412,796 B1* | 8/2008 | Hart | 43/44.83 |
| D600,316 S | 9/2009 | Lee | |
| D609,304 S | 2/2010 | Hatfield | |
| D615,148 S | 5/2010 | Beckman Lapre et al. | |
| D616,060 S | 5/2010 | Patrick | |
| D617,412 S | 6/2010 | Hatfield | |
| 7,856,751 B1* | 12/2010 | Moncrief | 43/4 |
| 2002/0051730 A1* | 5/2002 | Bodnar et al. | 422/33 |
| 2002/0177863 A1* | 11/2002 | Mandel et al. | 606/158 |
| 2003/0148945 A1* | 8/2003 | McNicol et al. | 514/12 |
| 2004/0261311 A1 | 12/2004 | Mattlage | |
| 2006/0156614 A1* | 7/2006 | Brzozowski | 43/44.82 |
| 2008/0207581 A1* | 8/2008 | Whiteford et al. | 514/183 |
| 2008/0209794 A1 | 9/2008 | Anderson | |

\* cited by examiner

ANTIMICROBIAL CONTAINING FISH HOOK AND METHOD OF USING AND MANUFACTURING SAME

BACKGROUND OF THE INVENTION

1. Field of the Invention

This invention generally relates to fishing tackle. More particularly, this invention relates to an improved fish hook that has antimicrobial properties to reduce the chance of infection in fishes that are caught and released during the course of fishing and reduce the chance of infection to anglers and others that may be accidentally impaled on the hook.

2. Background Information

Fishing as an activity is almost as old as man, with some studies showing that man regularly consumed fresh water fish dating back to the beginning of the Paleolithic period about 40,000 years ago. Recreational or sport fishing is an activity that is enjoyed by many people. In several states in the United States, fishing is the number one outdoor sport with one in four Americans participating at least once each year. The most common type of recreational or sport fishing is done utilizing a fishing rod which usually consists of a rod, a reel attached to the rod, a line attached to the reel, and a hook attached to the line. The practice of catching or attempting to catch fish with a hook is generally known as angling, and the practitioners as anglers. A basic fishing rod can be made by tying a hook to a line and tying the line to a stick. To fish, the angler uses the fishing rod to cast the hook into the water. The goal is to have the fish take the hook into its mouth so that the fish can be snagged and the angler can reel in the fishing line with the fish attached via the hook. Some fishing is also done whereby the hook is dragged across the fish's body so that the fish hook snags the fish externally. Fishing with a hook in most cases always results in the fish being wounded by the hook. Fishing to some is considered inhumane because of the nature of how the hook is used to impale the fish to catch it.

Fish Hooks

A "fish hook" is a device for catching fish generally, as noted above, by impaling them in the mouth or, more rarely, by snagging the body of the fish. Fish hooks have been employed for centuries by fisherman to catch fresh and saltwater fish with early examples found dating to 7000 BC. In 2005, the "fish hook" was chosen by Forbes as one of the top twenty tools in the history of man. There is an enormous variety of fish hooks in the world of fishing. Sizes, designs, shapes, and materials are all variable depending on the intended purpose of the fish hook. Fish hooks are designed to hold various types of artificial, processed, dead or living, baits (generally classified as Bait fishing); to act as the foundation for artificial representations of fish prey (e.g., Fly Fishing); or to be attached to or integrated into other devices that represent fish prey (e.g. Lure Fishing).

Despite the almost endless variety of fish hook designs there are some generally common components of a fish hook 10, as shown in FIG. 1, which is a useful basis for the discussion of any fish hook related development. The commonly referred to parts of a fish hook are the point 12, which is the sharp end that penetrates the fish's mouth or flesh; the barb 14, which is the projection extending backwards from the point 12 and which secures the fish from unhooking (although the barb 14 has been minimized or omitted from some "barbless" hooks 10 designed for catch and release applications); the eye 16, which is the end of the hook 10 that is connected to the fishing line or lure; the bend 18 and the shank 20 which are those portions of the hook 10 that connects the point 12 and the eye 16; and the gap 22, which is the distance between the shank 20 and the point 12. Another common attribute of a hook 10 is the bite 24 which is the distance from the point 12 to the bottom of the bend 18. Additionally common are "single" hooks 10, one of which is shown in FIG. 1, double hooks which can be described as two hooks having a shared or merged shank and eye one of which is also shown in FIG. 1, and triple hooks which can be described as three hooks having a shared or merged shank or eye, an example of which is also shown in FIG. 1.

Fish hooks 10 have been known to have been crafted from all sorts of materials, including wood, animal and human bone, horn, shells, stone, bronze, iron, plastic, steel, alloys and the like. Presently hooks 10 are most commonly manufactured from either high-carbon steel, steel alloyed with Vanadium, or stainless steel, depending on application. Most quality fish hooks 10 available presently are covered with some form of corrosion-resistant surface coating. Additionally, coatings are applied to color and/or provide aesthetic value to the hook. Hooks 10 have been coated with clear lacquer, gold, nickel, Teflon® polymer, tin and a variety of other materials.

Catch and Release

Many anglers practice "catch and release" whereby once the fish is caught and reeled in, the hook 10 is removed and the fish is returned to the water before experiencing serious exhaustion or injury. There are many reasons for releasing the fish back into the water. Sometimes catch and release is mandated as a conservation measure. Sometimes the angler simply does not want to keep the fish and merely enjoys the sport. Other times the angler catches a non-target fish and releases it back into the water. In some cases an angler catches a fish that is out of season and it cannot be kept. Other times there may be a limit on the size that the fish must be before the angler is allowed to keep the fish. Sometimes an angler has caught and kept their daily limit of fish but wants to continue fishing and must return any new fish that are caught back into the water. Sometimes anglers fish at waterways which are pay fishing spots. The angler must pay for any fish they keep. If the angler does not want to keep the fish then they will return the fish to the water. Regardless of the reason for returning the fish, with catch and release fishing, the hook is removed if possible and the fish is returned to the water.

Injury to Fish

As noted a fish hook 10 is designed to function by impaling the fish and remaining attached to the fish as the angler reels in a line that is attached to the hook 10. This impalement naturally creates a wound in the fish. Compounding the severity of the wound is that the fish hook 10 is typically not sterile. This occurs for many reasons such as the addition of bait that is added to a hook 10 or lure to increase the chances of catching a fish. These baits may contaminate the hook 10 with microbes. When a fish is impaled by a contaminated hook 10, microbes can be inserted into the wound. As with any wound, a chance of infection is created and often this infection results in the ultimate death of the fish. Even if the infection does not kill the fish, the infection causes it to suffer for a period of time, especially if the hook 10 is left in upon its return to the water.

It is advantageous to ensure the recovery of a fish that is caught and then released for many reasons. In "pay waterways" such as pay lakes, where the angler pays a waterway owner for the privilege to fish or based on the size of fish caught, fish are sometimes returned to the water because they are undersized or a non-target species. It would be advantageous to the pay waterway owner to increase the survival rate of fish returned to the water. Often waterways are stocked with fish by the state or local conservation authorities. It would be advantageous to increase the fish survival rate so that less fish would need to be stocked. Some people like to fish, but are saddened by the thought of killing the fish. It would be advantageous to them to be able to fish in such a way as to improve the odds of the fish's recovery. Many water ways such as ponds and lakes only have a certain number of large fish. It would be advantageous to help with the recovery of the fish so that there are more large fish to be caught by other anglers. It is also humane to treat an injured animal.

Currently anglers have no way to constantly sterilize their hooks, or treat the puncture wound caused by their hooks which results in the suffering and sometimes the death of the fish. The angler merely removes their hook and returns the injured fish to the water. It would therefore be advantageous and convenient for the angler to use a fish hook that has antimicrobial properties to sterilize the hook, reduce the chance of infection, and to treat the wound.

Injury to Anglers (and Spectators)

Fish hooks 10 are not limited to causing injury to fish. Anglers, and sometimes those merely in the area, can become hooked on a misplaced fish hook 10. Standard texts for emergency medicine include sections on treating fish hook injury, including descriptions of the "push through and cut off" technique for fishhook removal and the "string flick" technique for fishhook removal. While data on fishhook injuries is sparse, some emergency departments in heavily fished areas report more than 600 cases per year. This number obviously does not address the number of injuries that are self treated. The injury to humans from a fish hook is also quite susceptible to infection if left untreated. A smaller subset of non-fish fish hook injuries is represented by pets, which also are susceptible to infection. Thus, it would also be advantageous to use an antimicrobial fish hook in case the angler accidentally hooks themselves, which often happens. This would reduce the chance of the infection in the angler.

Fish Hook Prior Art Developments

There have been many improvements to the fish hook over the last few centuries.

U.S. Pat. Nos. 7,159,357 and 6,910,297 disclose composite fish hook designs that allege increased strength and penetration capability. U.S. Pat. No. 6,085,456 describes a fish hook designed to be stamped out of sheet metal for increased hook production. U.S. Pat. No. 6,055,763 discloses a glowing fish hook to increase attraction of the fish to the hook. U.S. Pat. No. 5,875,584 describes a hook for greater hooking and holding power. U.S. Pat. No. 5,024,020 describes a plastic fish hook that is designed to provide a "shock absorber action" during catching of a fish. U.S. Pat. No. 2,511,117 discloses a fishing lure in which the body of the lure, including the hook, is formed of translucent material to more nearly simulate an insect. U.S. Design Pat. D276,360 discloses an ornamental design for a transparent fishing hook. U.S. Published Patent Application 2008-0209794 discloses a fish hook formed of "an in situ composite of bulk-solidifying amorphous alloy" generally used in commercial fishing applications. US Published Patent Application 2004-0261311 describes an improved fishing hook that is coated with titanium to reduce the drag of the hook as it impales the fish. "Ornamental" fish hooks are disclosed in U.S. Pat. Nos. D617,412; D616060; D615,148; D609,304; D600,316 D556,292; D522,087; D507,034; D469,502; D467,989; D440,275; D404,795; D370,048; D315,593; D283,830; D252,336; D244,133

A number of the patentable improvements are particularly related to catch and release applications. U.S. Pat. No. 7,225,582 discloses a modified fish hook for catch and release applications intended to minimize the wound to the fish. U.S. Pat. No. 6,753,004 discloses a biodegradable fishing lure formed of fish digestible materials. U.S. Pat. No. 5,890,316 discloses a fish hook improvement designed to assist the fish in catch and release applications that have embedded hooks (hooks that cannot be easily removed), specifically disclosing a biodegradable fishhook. Similarly U.S. Pat. No. 4,715,142 discloses a "self-destructing" fish hook designed to corrode rapidly if left embedded in the fish in catch and release applications. U.S. Pat. No. 5,339,562 is entitled a "Pointless releasable fish hook", however it is actually a non-piecing tong type devise that is not a "fish hook" but rather a game trapping device, but it is designed for catch and release applications. Other "barbless" or retractable barb designed hooks for catch and release are disclosed in U.S. Pat. Nos. 4,998,375; 4,922,649; 4,858,371; 4,723,372; 4,570,373; 4,028,838; and 3,624,690. U.S. Design Pat. No. D242,919 discloses an ornamental design for what is called a "retrievable fish hook."

The above identified patents and applications, incorporated herein by reference, provide a brief overview of the many developments in the fish hook field, as well as illustrating the wide variety of fish hooks available. None of these improvements aid in sterilizing, treating, or reducing the effect on the wound itself of the impaling of the fish.

Thus one of the objects of the present invention is to treat the wound via an antimicrobial substance that is located on or in the hook. Yet another object of the invention is to sterilize the hook before it impales the fish to minimize the amount of foreign microbes that are injected into the wound. It is yet another object of the invention to continue to provide antimicrobial treatment to the fish, for a period of time. It is yet another object of the invention to provide temporary pain relief to the fish upon impalement.

Other advantages of the present invention will become apparent from a perusal of the following detailed description of presently preferred embodiments of the invention.

It is an object of the present invention to address the deficiencies of the prior art discussed above and to do so in an efficient, cost effective manner.

SUMMARY OF THE INVENTION

The various embodiments and examples of the present invention as presented herein are understood to be illustrative of the present invention and not restrictive thereof and are non-limiting with respect to the scope of the invention.

In the practice of the present invention, there is provided an improved fish hook that includes at least one shank; at least one bend that extends from the shank; at least one point defined by a free end of the bend, wherein the fish hook contains a substance whose purpose is to minimize infection and to treat the puncture wound of a fish that is caught. The substance optionally acts to sterilize the hook to reduce the entrance of microbes into the wound when the puncture occurs. The substance may also contain an anti-inflammatory or a pain reliever to reduce the suffering of the fish.

These and other advantages of the present invention will be clarified in the description of the preferred embodiments taken together with the attached figures.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DESCRIPTION OF THE PREFERRED EMBODIMENTS

Figure 1:
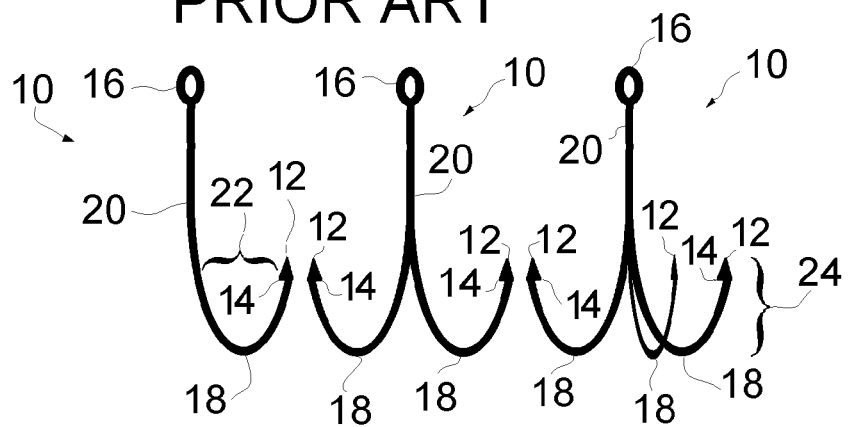
FIG. 1 schematically depicts representative examples of common fish hook shapes.

Generally the invention consists of a fish hook 10 with conventional aspects such as point 12, barb 14, eye 16, and bend 18 and shank extending from the point 12 to the eye 16, and wherein the hook 10 contains an antimicrobial substance 30.

The barbless and retractable barb designs discussed above may also be advantageous for forming the hook 10 of the present invention as they facilitate the release portion of "catch and release"; however these designs must be balanced with their detrimental effect, if any, on the catch portion of catch and release. For example, if a barbless hook design is selected to implement the present invention and the barbless aspect reduces the ability to catch fish (e.g., too many fish are lost during reeling in of a catch), then the angler will leave the coated hook in his tackle box and the present invention in that context will be of little assistance in treating the wounds of fish.

A similer critical balancing criteria must be identified relating to costs of the hook 10 of the present invention. If the cost of the antimicrobial fishing hook of the present invention is too high as compared to similar non-antimicrobial fishing hooks, then the present invention, no matter how effective at actually treating fish (or other) wounds, will be left on the store shelves and thus not be effective in practice. The following embodiments are cognizant of this critical balance.

The substance 30 is either located on the surface of the fish hook 10 or contained within the fish hook. If contained within the fish hook 10, it can be in the composition of the fish hook 10 or in channels or slots that have been cut into the fish hook 10 and filled with the antimicrobial substance.

The hook 10 can be made of conventional materials with high-carbon steel, steel alloyed with vanadium, or stainless steel being the most common. The present invention may be particularly advantageous for advancing catch and release concerns when the hook 10 is formed of biodegradable materials such as disclosed in U.S. Pat. Nos. 6,753,004 and 5,890,316, although cost becomes a particular concern with these alternatives.

An antimicrobial substance is a substance that kills or inhibits the growth of microorganisms such as bacteria, fungi, parasites, or protozoans, as well as destroying viruses. Antimicrobial substances may target one, some, or all of the above. Antimicrobial substances either kill microbes (microbicidal) or prevent the growth of microbes (microbistatic). Antimicrobial substances are not new. There have been many antimicrobial substance developed over thousands of years. Silver for instance has been used to treat wounds in soldiers since before the invention of antibiotics. Selenium, zinc, and copper are also well known for their antimicrobial properties. These metals rob electrons from bacteria and other pathogens when in contact, stripping their electrons and thereby disrupting their functioning.

The purpose of the antimicrobial substance 30 on the hook 10 is to reduce the chance of infection and/or speed the healing time of the puncture wound created by the hook 10 (generally in the fish in the intended application but maybe in the angler or others due to accidents). This substance 30 also sterilizes the hook 10, reducing the chance of infection. If the hook 10 is left in the fish upon its release (e.g., if the hook 10 is swallowed), the hook 10 would continue to provide antimicrobial properties for a period of time.

Generally referring again to FIG. 1 and the host of prior art fish hook designs disclosed in the above cited patents and patent applications which are incorporated herein by reference, fish hooks 10 come in all shapes and sizes. It is important to note that the shape of the improved fish hook can vary and the shapes depicted in FIG. 1 are not all encompassing of the invention. The improved fish hook 10 of the present invention can be in any shape as long as it impales a fish for the means of catching it and provides an antimicrobial substance to treat and/or minimize the wound.

To use the invention, the angler would use the improved fish hook 10 incorporating an antimicrobial material 30 instead of the existing unimproved fish hooks.

Sodium Percarbonate Coating

Figure 2:
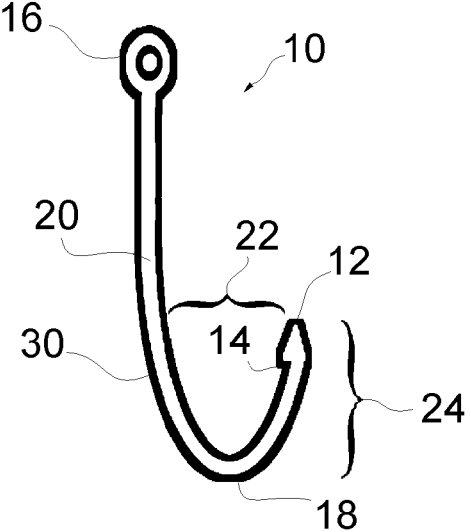
FIG. 2 schematically depicts a fish hook that contains a layer of antimicrobial substance that coats the entire hook in accordance with one embodiment of the present invention.
Figure 3:
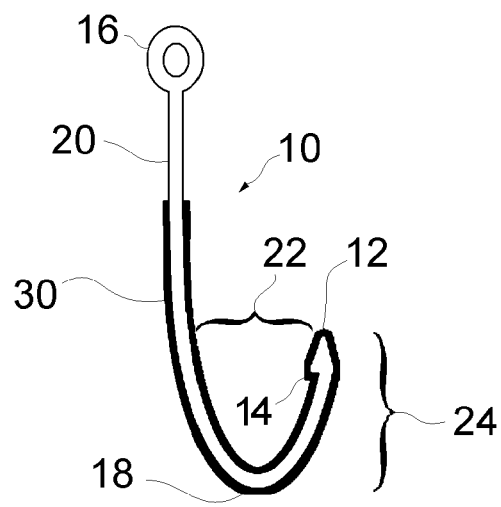
FIG. 3 schematically depicts a fish hook that contains a layer of antimicrobial substance on only a portion of the hook in accordance with another embodiment of the present invention.

In one embodiment of the present invention, a water soluble coating containing Sodium Percarbonate ($Na_2CO_3.1.5H_2O_2$) is used as the antimicrobial material to coat the fish hook 10 (such as shown in FIGS. 2 and 3). The coating of material 30 in this embodiment is designed to start dissolving on contact with water. As the coating of material 30 dissolves, more sodium percarbonate would be exposed to provide antimicrobial properties, thus the hook 10 will continually dispense antimicrobial material 30. The coating of material 30 can be colored different from the material of the remaining portions of the hook 10 so that once completely dissolved; the angler would be given a visual indication that the hook 10 is no longer providing antimicrobial properties. The coating of material 30 does not need to encompass the entire fish hook 10. If desired, only a portion that would contact the fish could be coated with material 30 as shown in FIG. 3.

Selenium Coating

In one embodiment of the present invention, a coating (a water soluble or permanent coating) containing selenium is used as the antimicrobial material to coat the fish hook 10 (such as shown in FIGS. 2 and 3). The selenium based antimicrobial materials could be added to a degradable or time released coating. This time released coating may be glue or other binder that is water soluble and slowly dissolves upon contact with water. If a fish is punctured with the hook, the antimicrobial substance will be placed into the wound of the fish. The coating of material 30 does not need to encompass the entire fish hook 10. If desired, only a portion that would contact the fish could be coated with material 30 as shown in FIG. 3.

Plating

In another embodiment of the present invention, a hook 10 is plated with the antimicrobial substance 30. The preferred substances for plating of a hook 10 with antimicrobial substance 30 are silver, copper, selenium, or zinc, but can be any substance that provides antimicrobial properties that can be effectively plated onto a conventional hook 10 is acceptable for this plated embodiment. Some metals such as zinc are anti-corrosive. If the antimicrobial substance used is also anti-corrosive, a portion of hook 10 can be left un-plated, such as shown in the embodiment of FIG. 3, so that corrosion occurs should the hook 10 be left in the fish upon release while still providing antimicrobial properties. The plated hook 10 could also be plated and then sanded or ground to expose various portions of the hook 10 making the hook 10 susceptible to corrosion. It is not required that the entire hook 10 be plated with material 30, only enough of the plating substance 30 must be available to provide antimicrobial properties. This would be useful to reduce the amount of silver, copper, selenium, or zinc needed on a fish hook 10 to reduce weight or cost. Other partially plated patterns could be used, such as stripes, to provide plated and un-plated portions of hook 10.

Plating could be any form such as electroplating, immersion plating, electro-less plating, or chemical plating. Regardless of the method used to plate, the end result is that the hook 10 contains a plated layer of the antimicrobial substance 30 at least on portions of the hook 10. The plating could be a single metal or a combination of metals to enhance protection and/or reduce cost.

Metallic Coating

It yet another embodiment of the present invention, a hook 10 is coated with a metallic antimicrobial substance 30. The preferred metallic substances 30 are silver, copper, or zinc, but can be any metallic substance that provides antimicrobial properties can be used as a metallic coating. The metallic antimicrobial substance 30 can be coated onto the hook 10 either by itself or with the addition of glues, binders, wax, or other substances that aid in adhesion. For instance the silver, copper, metallic selenium, zinc or other metallic substances could be added to the lacquer that commonly coats fish hooks 10 to reduce corrosion. The coating could be a single substance, or a combination of multiple substances to enhance protection and/or reduce cost.

Alternatively these metallic antimicrobial materials could be added to a degradable or time released coating. This time released coating is glue or other binder that is water soluble and slowly dissolves upon contact with water. If a fish is punctured with the hook, the antimicrobial substance will be placed into the wound of the fish.

There are various methods that exist to coat items with these materials. For instance, the hook 10 could be dipped into the substance or the substance could be sprayed onto the hook 10 with a sprayer. Alternatively, the fish hook 10 is dipped into molten zinc, copper, or metallic selenium to coat the fish hook and then removed. Once removed, the fish hook would contain a layer of the antimicrobial substance 30. Some metals such as zinc are anti-corrosive, and as noted above if the antimicrobial substance 30 used is also anti-corrosive, a portion of hook 10 can be left uncoated so that corrosion occurs should the hook 10 be left in the fish upon release while still providing antimicrobial properties. The coated hook 10 could also be coated and then sanded or ground to expose various portions of the hook 10 making the coated hook 10 susceptible to corrosion. It is not required that the entire hook 10 be coated; only enough of the substance must be available to provide antimicrobial properties. This would be useful to reduce the amount of silver, copper, selenium, or zinc needed on a fish hook to reduce weight or cost. As noted above with the plating, other patterns to partially coat the hook 10 could be used such as stripes.

Powder Based Water Soluble Coatings

In yet another embodiment of the present invention, zinc powder, copper powder, silver powder, selenium powder and/or mixtures thereof is added to a water soluble coating that is applied to the fish hook 10 as material 30. The coating forming material 30 in this embodiment is designed to start dissolving on contact with water. As the coating dissolves, more zinc (and or associated) powder would be exposed to provide antimicrobial properties. The coating can be colored so that once completely dissolved, the angler would be given a visual indication that the hook 10 is no longer providing antimicrobial properties similar to the Sodium Percarbonate embodiment disclosed above. The coating does not need to encompass the entire fish hook. If desired, only a portion that would contact the fish could be coated.

Other Wound Care Components

In the embodiments of the present invention in which the hook 10 is coated with a time released antimicrobial substance, the invention contemplates that anti-inflammatory or pain relief substances could also be added to the time release coatings. Further as the substance dissolves it could sterilize the hook.

In these embodiments of the present invention, the hook 10 may be coated with an antimicrobial substance that further contains a numbing agent such as procaine. Upon impalement of the fish, the procaine acts to provide relief to the fish by numbing the area surrounding the puncture.

Hook Manufacture Incorporating Antimicrobial Material Directly

In yet another embodiment of the present invention, silver, copper, or selenium is used in the composition of the hook 10. Silver, copper, and selenium are naturally antimicrobial. When these metals or substances are added, the hook 10 itself becomes antimicrobial with no plating or coating required. It will then provide sterilization of the hook, antimicrobial support upon puncture, as well as lasting effects should it be left in the fish upon release. While silver, copper, and selenium are readily available metals, any substance that provides antimicrobial properties can be used as long as its concentration results in providing the hook with antimicrobial properties.

Galvanized Zinc

In yet another embodiment of the present invention, zinc is galvanized onto the fish hook 10 to form the material 30. This can be easily done by creating a mixture of 2 g zinc powder, 10 mL 10-15% NaOH solution and heating the mixture to near boiling. The fish hook 10 would be dipped into the mixture (fully for FIG. 2 or partially for FIG. 3). After a few minutes the fish hook 10 is removed and will contain a layer of zinc 30 which would provide antimicrobial properties. Cold galvanizing zinc paint can also be used to coat the hook with a layer of zinc.

While sodium percarbonate, silver, copper, selenium, and zinc are the preferred substances in the various embodiments to provide antimicrobial protection, they are by no means the only ones. Any substance that provides antimicrobial properties can be used.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fish hook comprising: an eye, a shank, a bend and at least one impaling end, and a coating including at least a binder and an antimicrobial substance on the outer surface of at least a portion of the least one impaling end and bend, and configured to reduce microbial activity on the surface of the fish hook.

2. A fish hook as recited in claim 1, wherein the coating on the outer surface at least a portion of the fish hook is degradable during fishing.

3. A fish hook as recited in claim 1, wherein the coating on the outer surface at least a portion of the fish hook is water soluble.

4. A fish hook as recited in claim 3, wherein the water soluble coating contains Sodium Percarbonate forming at least part of the antimicrobial substance.

5. A fish hook as recited in claim 3, wherein the water soluble coating contains selenium forming at least part of the antimicrobial substance which is located on a portion of the fish hook.

6. A fish hook as recited in claim 1, wherein the binder is a glue to which is added the antimicrobial substance.

7. A fish hook as recited in claim 1, wherein the antimicrobial substance is selenium.

8. A fish hook as recited in claim 1, wherein said hook contains at least one of anti-inflammatory and pain relieving substances.

9. A fish hook configured to be selectively left in the fish with minimized harm to the fish comprising: an eye; a shank extending from the eye, a bend extending from the shank, a point coupled to the bend; and a coating including a binder and an antimicrobial substance on an outer surface of at least a portion of the point and bend and configured to contact the location that the fish is impaled on the hook for aiding in the recovery of a fish caught and released during fishing by reducing microbial activity in the wound over time.

10. The fish hook according to claim 9 wherein the coating with the antimicrobial substance is water soluble.

11. The fish hook according to claim 10 wherein the water soluble coating contains Sodium Percarbonate.

12. The fish hook according to claim 10 wherein the water soluble coating contains zinc powder, copper powder, silver powder, selenium powder and/or mixtures thereof.

13. The fish hook according to claim 10 wherein the water soluble coating contains at least one of anti-inflammatory, numbing agents or pain relief substances.

14. The fish hook according to claim 10 wherein the water soluble coating contains selenium.

15. The fish hook according to claim 9 wherein the coating is degradable.

16. The fish hook according to claim 15 wherein the coating contains Sodium Percarbonate.

17. A fish hook as recited in claim 15, wherein the binder is a glue.

\* \* \* \* \*